United States Patent [19]

Greszczuk

[11] Patent Number: 4,696,711
[45] Date of Patent: Sep. 29, 1987

[54] METHOD FOR FORMING HOLES IN COMPOSITES

[75] Inventor: Longin B. Greszczuk, Mission Viejo, Calif.

[73] Assignee: McDonnell Douglas Corporation, Long Beach, Calif.

[21] Appl. No.: 537,867

[22] Filed: Sep. 30, 1983

[51] Int. Cl.[4] .............................................. B32B 31/18
[52] U.S. Cl. .................................. 156/173; 156/193; 156/245; 156/252; 156/253; 156/307.1; 156/285; 264/154; 264/155; 264/156
[58] Field of Search ............... 156/173, 174, 175, 193, 156/245, 252, 253, 307.1, 285; 264/154, 155, 156

[56] References Cited

U.S. PATENT DOCUMENTS

| | | | |
|---|---|---|---|
| 1,586,076 | 5/1926 | Dickey | 264/156 |
| 1,608,727 | 11/1926 | Dickey | 264/156 |
| 1,837,146 | 12/1931 | Brooks | 264/155 |
| 2,289,177 | 7/1942 | Chandler | 264/156 |
| 2,989,107 | 6/1961 | James et al. | 156/92 |
| 3,036,728 | 5/1962 | Gibb | 156/252 |
| 3,106,940 | 10/1963 | Young | 156/253 |
| 3,184,353 | 5/1965 | Balamuth et al. | 156/92 |
| 3,440,117 | 4/1969 | Soloff et al. | 156/92 |
| 3,481,803 | 12/1969 | Hewitt | 156/92 |
| 3,517,410 | 6/1970 | Rapisarda | 264/156 |
| 3,704,194 | 11/1972 | Harrier | 264/156 |
| 3,734,797 | 5/1973 | Byers | 156/253 |
| 4,299,871 | 11/1981 | Forsch | 156/92 |

*Primary Examiner*—Caleb Weston
*Attorney, Agent, or Firm*—John P. Scholl; George W. Finch; Donald L. Royer

[57] ABSTRACT

An inexpensive method of forming close tolerance holes in composites utilizing the B-stage characteristics of those composites. The holes are formed by assembling the composite structure, B-staging the composite material, cutting or drilling undersized holes in the B-staged material, inserting appropriate male forming pins, dies or mandrels in the holes, completing the curing of the composite structure with pins in place and then removing the pins to leave high quality, close tolerance holes in the composite structure.

6 Claims, 4 Drawing Figures

METHOD FOR FORMING HOLES IN COMPOSITES

BACKGROUND OF THE PRESENT INVENTION

This invention pertains to a method of forming close tolerance high quality holes in fiber reinforced composite materials. The prior methods for producing high quality holes in laminated composite materials required a series of operations. First, the composite structure was formed by, for instance, laying up a series of impregnated fiber layers and then completely curing the composite under heat, pressure, and the required vacuum conditions. Second, a pilot hole was drilled in the composite material, usually with a carbide or diamond drill, followed by an undersized hole. Finally, to bring the hole into tolerance it was reamed to the proper dimensions and then countersunk as necessary. Several dificulties may be encountered during the drilling procedure, such as material breakout or delamination on the front and back face of the composite laminate due to drilling pressure or upon drill removal, and overheating of the composite. When a hole is drilled in a composite, hazardous dust may be formed which requires special handling, such as hoods, enclosures and othe means to protect the working environment. Hole surface abrasion may be caused by abrasive shavings from the drilling procedure and especially so when drilling through graphite and metal simultaneously. Dull drill bits or lack of a proper coolant causes overheating of the composite materiall resulting in residual stresses, charring and aperture wall glazing. Even when proper coolant is utilized there is the possiblity of aperture wall contamination by the coolant and coolant migration into the laminate. Any flexibility in the holding fixture for the composite part, or asymmetry in drilling and grinding or excessive accumulation of swarf can produce out-of-tolerance, out-of-round holes, or unacceptable hole surface finishes.

An array of precision tools may be required to complete the close tolerance holes in high strength composites such as graphite epoxies. Among the tools utilized in forming the holes in the graphite epoxy laminates are carbide pr carbide-tipped drill bits and carbide or diamond reamers, both of which are expensive and have a limited useful life. Upon completion of the hole in the composite, the hole size and quality may have to be examined by one or more non-destructive evaluation (NDE) techniques including ultrasonic C-scan, boroscope inspection, as well as dimensiional checks and visual inspection. All of these various manufacturing and inspection techniques for hole fabrication are both expensive and time consuming.

BRIEF DESCRIPTION OF THE INVENTION

The proposed method disclosed herein will eliminate many of the costly drilling and reaming steps as well as the expensive tools utilized in the prior arst as for example, diamond or carbide drill bits, which have limited life. By the inventive method it is proposed to utilize conventional, inexpensive tooling with indefinite life-span. A second object of the method is to eliminate the potential defects found around holes in the composite due to breakouts, delamination and material contaminations, and thus also eliminate the necessity of NDE. The third object of this invention is to reduce hold preparation cost in composites through higher drilling speeds. A fourth object is to allow formation of holes in the composite, without any hazardous dust being generated.

The inventive method involves the following steps: Preparation and formation of the composite structure, curing the composite to B-stage under appropriate heat and pressure conditions, cutting or drilling a hole in the composite structre, inserting a male-forming die or mandrel into the hole, completing the curing of the composite material and removing the die or mandrel to leave a high quality appropriately formed straight-sided or countersank hole within the requisite tolerances.

DETAILED DESCRIPTION OF THE PREFERRED EMBODIMENT

Figure 1:
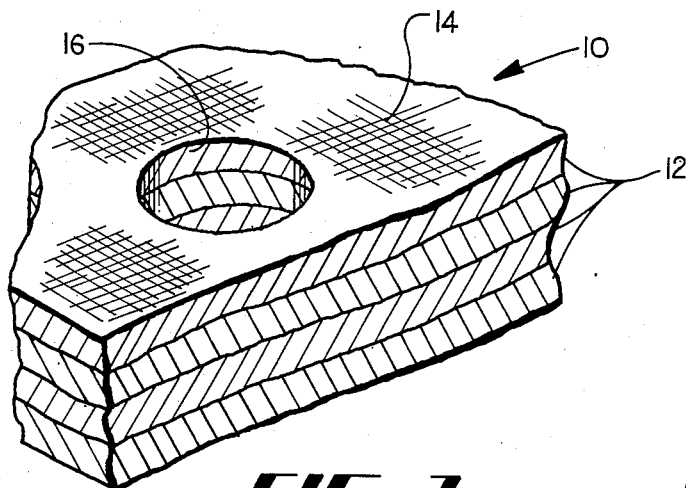
FIG. 1 is a perspective view showing a partially cured composite laminate structure in which a rough undersized hole has been drilled.
Figure 2:
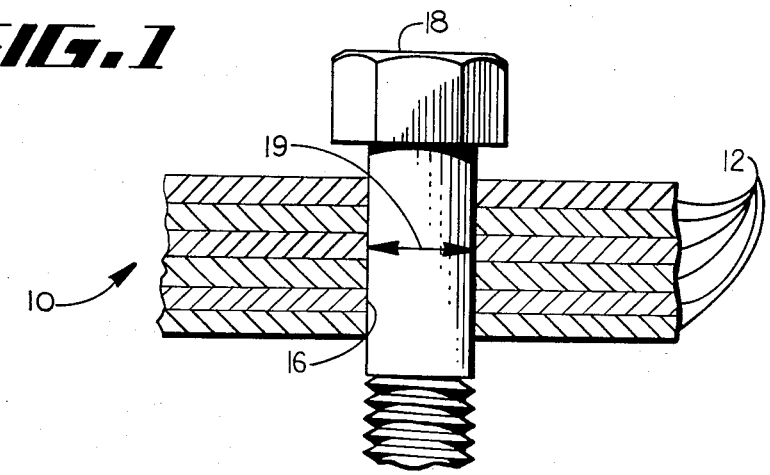
FIG. 2 is a sectional view through a laminate material having a bolt inserted in a rough cut hole.

In FIG. 1 the composite part 10 is shown which is comprised of a series of resin impregnated layers 12 of advanced composites with multi-directional fibers and weaves 14. These fibers may be comprised of glass, graphite, boron, alumina, Kevlar, silicon carbide, polyvinyl alcohol, metallic, ceramic and organic, as well as more exotic fibers. The matrix materials may be expoxies, polyesters, polysulfones, polyimides, vinyl esthers, silicones, bismaleimides, thermoplastics, phenolics, melamines, polyurethanes, polyether ether ketones (PEEK). The impregnated layers 12, are stacked to the desired thickness of the composite structure and then partially cured to B-stage. B-stage cure may be defined as state of polymerization (without full crosslinking) wherein the resin softens and flows under heat and pressure. By example, a composite made of Thornel 300/5208 prepreg (marketed by Narmco located in Costa Mesa, Cal.) was prepared and B-staged by applying a layer of release fabric, as for example, light weight Teflon-coated glass cloth, on each side of the lay-up followed by two layers of bleeder cloth (120 glass cloth). The assembly was then placed on an aluminum plate covered with Armalon release film (marketed by DuPont Co. of Wilmington, Del.). One ply of FEP (Fluorinated ethylene propylene) co-polymer film, pin-perforated on 3-inch center, and one ply of 181 glass breather cloth were applied on top of the assembly and the assembly was enclosed in a vacuum bag. Full vacuum was pulled applying approximately 14 psi external pressure to the part, and the assembly was placed in an oven, preheated to 200° F., for a maximum of 30 minutes. The assembly was cooled to room temperature under vacuum and the bleeder cloth as well as the release film were removed. As a result of this B-stage curing, the composite was debulked and partially consolidated.

The composite structure may also be formed by wet winding or braiding of impregnated fibers, stacking of woven cloth prepreg, layering of resin impregnated mat or formation of an impregnated discontinuous fiber-reinforced structure.

When the resin in the composite part 10 has cured to the B-stage, a hole 16 may be cut in the composite structure using inexpensive steel drill bits due to relatively soft nature of the composite material. The drilling speed is relatively fast and there is no need for coolants which might cause contamination of the composite material. No dust is formed when drilling the B-staged composite and little or no heat is generated to glaze or char the wall of the hole.

A bolt 18 of appropriate diameter 19 is inserted in the hole acting as a male die or forming mandrel. At this point, the composite is ready for completion of the normal cure cycle. For example, the curing steps would be as follows in the case of a layered composite structure made up of Thornel 300/5208: enclose the part in vacuum bag; place the assembly in a cold autoclave and pull vacuum; hold vacuum and raise temperature to 180° F. at 5°–9° F./ min rate; begin to pressurize the autoclave to 100 psi; when autoclave pressure reaches 20 psi, vent vacuum to atmosphere; continue heating to 350° F.; hold at 350° F. and pressure of 100 psi for 2 hours; cool under pressure to below 150° F.; remove assembly from autoclave, and remove the vacuum bag.

Figure 3:
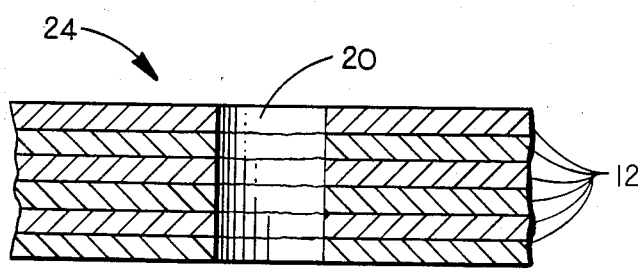
FIG. 3 is a sectional view through a completely cured composite laminate structure having a straight sided hole formed by the inventive method.
Figure 4:
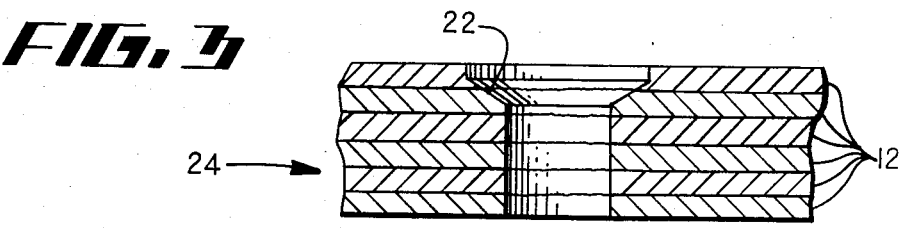
FIG. 4 depicts an alternate embodiment wherein a completely cured laminate has had a countersunk hole formed by the inventive method.

Once the composite has been completely cured the bolt 18 is removed as shown in FIG. 3 leaving a high quality close tolerance hole 20 in the composite.

Where it is desired to have a countersunk hole, a different male forming die or bolt is used which embodies a tapered section and a straight section in the fabrication of a hole and results in a finished hole 22 as shown in FIG. 4 with the straight sides and countersunk top.

The bolt 18 may be coated with a release agent to enhance the removal of the bolt 18 from the cured composite 24. The hole in the B-staged materiall may be up to approximately 20% undersize/oversize from the required diameter without affecting the quality and strength of the hole in a cured composite.

A novel method of forming holes in composites which fulfill all of the objects and advantages sought has been shown and described therefore. Many changes, alterations, modifications and other uses and applications of the subject method will become apparent to those skilled in the art after considering this specification together with the accompanying drawings. All such changes, alterations and modifications which do not depart from the spirit and scope of the invention are deemed to be covered by the invention which is limited only by the claims which follow.

What is claimed is:

1. A method for the formation of holes in composite structure comprising the steps of:
   forming composite structure impregnated with a matrix material;
   B-staging the composite structure;
   cutting an appropriate size hole in the composite structure;
   inserting a male forming die in the composite structure;
   completing the curing of the structure with the die in place;
   removing the male forming die leaving close tolerance hole in the composite structure.

2. The method of claim 1 wherein the fibers forming the composite are from the following group: glass, graphite, Kevlar, boron, alumina, silicon carbide, polyvinyl alcohol, metallic, ceramic and inorganic fibers.

3. The method of claim 1 wherein the matrix material forming the composite is one of the following materials; epoxies, polyesters, polysulfones, polyimides, vinyl esthers, silicones, bismaleimides, thermoplastics, phenolics, melamines, polyurethanes, and polyether ether ketones (PEEK).

4. The method of claim 1 wherein the composite structure formed by layering of fiber reinforced prepreg.

5. The method of claim 1 where the composite structure is formed by wet winding of fibers impregnated with the matrix material on a mandrel.

6. The method of claim 1 wherein the B-staging of the composite structure comprises the steps of: placing the composite structure in a vacuum bag or a press; applying full vacuum of 14 psi external pressure to produce consolidation; heating up the structure to 50–80% of its cure temperature, and holding the part at temperature and pressure for 10–30 minutes.

* * * * *